United States Patent

[11] 3,549,915

| | | | | |
|---|---|---|---|---|
| [72] | Inventor | Lawrence L. Prem, Tarzana, Calif. | [50] | Field of Search............................................ 310/11 |
| [21] | Appl. No. | 743,661 | [56] | References Cited |
| [22] | Filed | July 10, 1968 | | UNITED STATES PATENTS |
| [45] | Patented | Dec. 22, 1970 | 3,376,440  4/1968  Palmer.......................... 310/11 |
| [73] | Assignee | North American Rockwell Corporation | | |

*Primary Examiner*—David X. Sliney
*Attorneys*—H. Frederick Hamann, L. Lee Humphries, Thomas S. MacDonald and Robert M. Davidson

[54] METHOD AND APPARATUS FOR GENERATING PULSE ELECTRICAL POWER USING A MAGNETOHYDRODYNAMIC GENERATOR SYSTEM
3 Claims, 1 Drawing Fig.

[52] U.S. Cl.................................................... 310/11
[51] Int. Cl...................................................... H02n 4/02

ABSTRACT: Pulse electrical power is generated by the alternate and sequential discharge of an electrically conductive fluid through a magnetohydrodynamic (MHD) generator from fluid sources connected through the MHD generator which results in a desired voltage output to an external circuit.

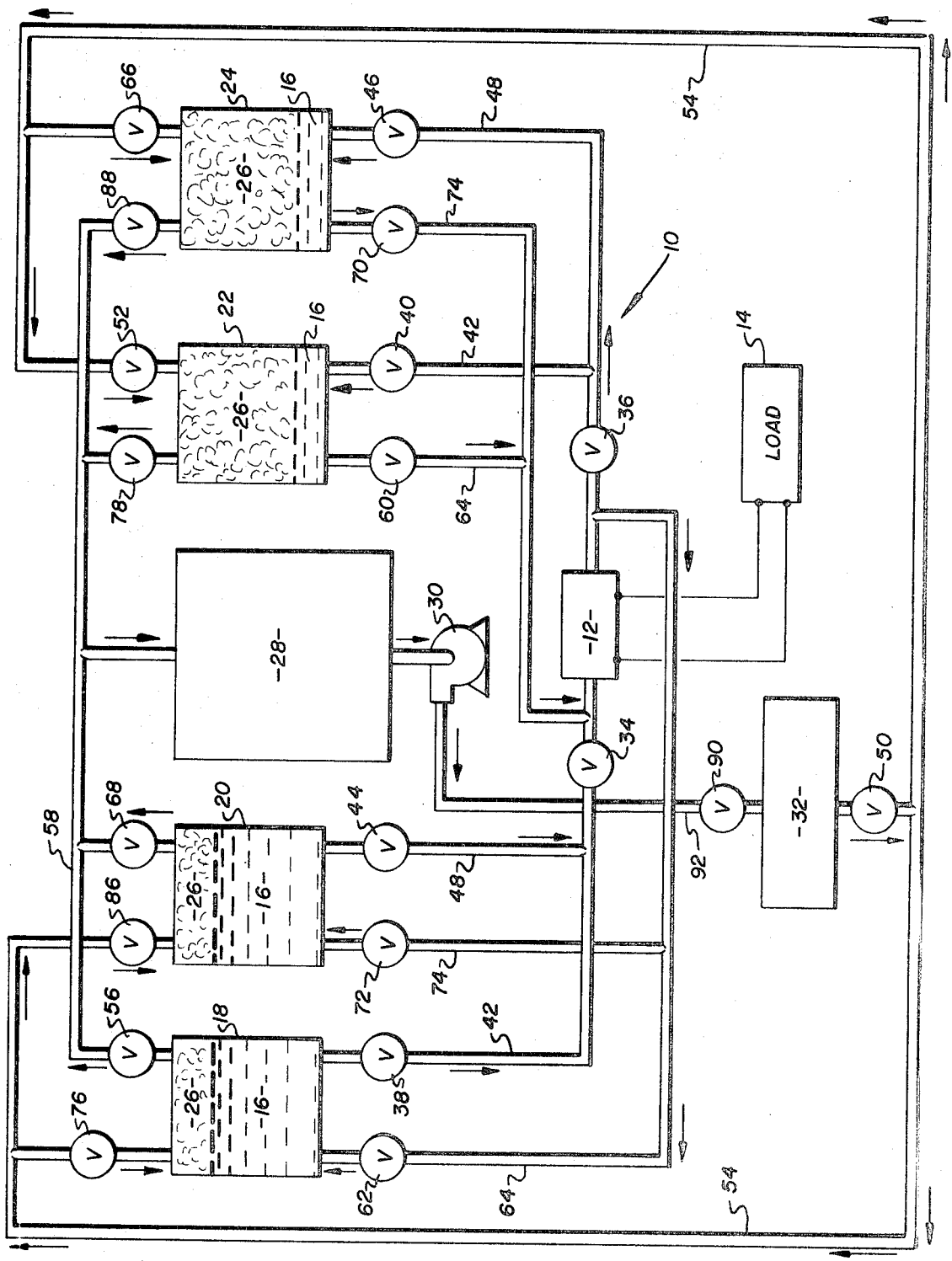

3,549,915

METHOD AND APPARATUS FOR GENERATING PULSE ELECTRICAL POWER USING A MAGNETOHYDRODYNAMIC GENERATOR SYSTEM

BACKGROUND OF THE INVENTION

The present uses for pulse electrical power, i.e., conversion or storage and dissipation of very high energy levels ($10^5$ to $10^8$ joules or higher) for a short time duration, are limited to specialized applications such as, inter alia, hypersonic wind tunnels, high energy pulsed lasers, for radar, sonar and other power supplies, and plasma research. Several methods are currently being investigated for obtaining the desired pulse power; for example, electrical sources such as capacitors, electrochemical sources such as batteries and fuel cells, explosives, superconductivity, and magnetohydrodynamic (MHD) systems. The present invention uses the basic principle of a MHD generator to develop the desired pulse electrical power.

MHD generators convert the kinetic energy of an electrically conductive working fluid into electrical energy by moving the working fluid through a primary or applied magnetic field set up across the MHD generator. The interaction of the moving fluid and the primary magnetic field induces an electrical field with current flow in a direction that is mutually perpendicular to both the direction of fluid motion and the magnetic field. See U.S. Pat. No. 3,320,444 to L. L. Prem, assigned to the same assignee as the present invention.

"Blow-down" MHD systems have been successfully operated. (Wang, T. C. and Dudzinsky, S. J., "Theoretical and Experimental Study of a Liquid Metal MHD Induction Generator," 7th Symposium on Engineering Aspects of MHD, Princeton, N. J., 1966.) These systems include a high-pressure supply tank, connected through a MHD generator section to a receiver tank, and the necessary system controls. An electrically conductive fluid is forced, under high gas pressure from the supply tank, through the MHD generator and into the receiver tank. This "run" can extend from 30 to 60 seconds depending on the system pressure and other system parameters. At the completion of the run, the electrically conductive fluid is returned to the supply tank. Net power output from such a blow-down MHD system is about 10 kilowatts ($10^4$ joules). Obviously, this power output is of relatively short duration and is not sufficient for pulse electrical power requirements in the $10^5$ to $10^8$ joules or higher power ranges.

Yet, a MHD system is desirable. It is compact and rugged, contains no moving parts, does not require cooling, operates only when power is needed, is easy to repair, and delivers both alternating current and direct current. A MHD system is immediately available without the need for any time-consuming, preoperational preparation. Further, a MHD system needs no large fuel storage or complementary operational logistics. However, known MHD systems, particularly the cited blow-down MHD system, do not permit the generation of pulse electrical power in the noted power ranges.

OBJECTS OF THE INVENTION

Accordingly, it is an object of the invention to provide a new and improved method and apparatus for generating pulse electrical power using a magnetohydrodynamic generator system.

It is an object of the invention to provide a pulse electrical power magnetohydrodynamic generator system that is a closed-loop system.

It is an object of the invention to provide a pulse electrical power magnetohydrodynamic generator system operable at ambient temperatures.

It is an object of the invention to provide a pulse electrical power magnetohydrodynamic generator system that permits reduction in electrically conductive fluid inventory and reduction in system storage volume without limiting the system operating time.

SUMMARY OF THE INVENTION

Briefly, in accordance with the invention a new and improved method and apparatus is provided for the generation of pulse electrical power at high energy levels by the sequential discharge of an electrically conductive fluid from a plurality of supply tanks through a magnetohydrodynamic generator so that a high energy pulse power is generated for a relatively long time duration where desired.

While the specification concludes with claims particularly pointing out and distinctly claiming the subject matter which may be regarded as the invention, the organization and method of operation, together with further objects, features, and the attending advantages thereof, may best be understood when the following description is read in connection with the accompanying drawing.

BRIEF DESCRIPTION OF THE DRAWING

The single FIG. is a schematic block diagram of one form of the pulse electrical power magnetohydrodynamic generator system of the invention

DESCRIPTION OF THE INVENTION

Referring to the drawing, one form of pulse electrical power magnetohydrodynamic generator system 10 has a MHD generator section 12 electrically connected to an external load 14. The pulse power MHD system 10 generates the desired electrical power pulses by passing an electrically conductive fluid through the MHD generator section 12. Initially, the electrically conductive fluid 16 is contained in a first set of tanks 18 and 20. Supply tanks 18 and 20 are connected by suitable piping and control valves, as will be described hereinafter, to a second set of tanks 22 and 24 through the MHD generator section 12. In the pulse power MHD system 10, the electrically conductive fluid 16 does not completely fill the total volume as defined by the tanks and system piping. The remaining system volume contains a cover gas 26 that is maintained at different pressure values in the system. Thus, the cover gas 26 is at a high pressure in tanks 18 and 20, and at a low pressure in tanks 22 and 24 as illustrated. The tanks 18, 20, 22, and 24 are selectively connected to a low pressure gas reservoir 28 that collects the low pressure cover gas during system operation. This low pressure gas is compressed by a suitable compressor 30 and stored in a high pressure gas reservoir 32. The high pressure cover gas is selectively directed to the tanks 18, 20, 22, and 24 during system operation.

Operatively, the desired pulse electrical power is generated by the pulse power MHD system 10 through the following system cycle which is offered as an example to assure a working understanding of the present invention and is intended as not limiting the scope of the invention as defined by the claims appended hereto.

Initially, all the system control valves are considered closed and tanks 18 and 20 charged with electrically conductive fluid 16 such as a liquid metal which can be a mixture of sodium (Na) and potassium (K); for example, NaK–78 (22 percent Na and 78 percent K). The conductive fluid 16 is maintained under a high pressure cover gas 26 such as pressurized nitrogen ($N_2$) in tanks 18 and 20.

Control valves 34 and 36 are opened. These valves, as well as all system valves described hereinafter, are actuated to an open position by conventional valve actuators (not shown for purposes of clarity in illustrating the system 10) such as control windings that are energized by a program controller or the like. Although the system valves could be manually actuated, automatic programmed actuation is preferred. Control valves 38 and 40 are opened and the electrically conductive fluid 16 in tank 18 discharges, i.e. is forced under high cover gas pressure, through the MHD generator section 12 into tank 22 through pipe 42. As the fluid 16 passes through the MHD generator section 12, electrical power is generated in a known manner by the generator.

Control valves 38 and 40 are then closed, and simultaneously control valves 44 and 46 are opened. The electrically conductive fluid 16 in tank 20 discharges through the MHD section 12 into tank 24 through pipe 48. Again electrical power is generated by the MHD generator section 12. While the contents of tank 20 are discharging into tank 24, control valves 50 and 52 are opened and tank 22 is pressurized through line 54 from the high-pressure gas reservoir 32, and control valve 56 is opened to vent the remaining cover gas 26 in tank 18 through line 58 to the low-pressure gas reservoir 28. When tank 22 is fully pressurized and tank 18 is fully vented, control valves 50, 52, and 56 are closed.

Control valves 34 and 36 are then closed as the contents of tank 20 completely discharge into tank 24. Simultaneously, control valves 44 and 46 are closed, and valves 60 and 62 are opened and the electrically conductive fluid 16 in tank 22 discharges through the MHD generator section 12 into tank 18 through pipe 64. Again electrical power is generated. While the contents of tank 22 are discharging into tank 18, control valves 50 and 66 are opened and tank 24 is pressurized through line 54 from the high-pressure gas reservoir 32, and control valve 68 is opened to vent the remaining cover gas in tank 20 through line 58 to the low-pressure gas reservoir 28. When tank 24 is fully pressurized and tank 20 is fully vented, control valves 50, 66 and 68 are closed.

Control valves 60 and 62 are then closed, and simultaneously control valves 70 and 72 are opened. The electrically conductive fluid 16 in tank 24 discharges through the MHD generator section 12 into tank 20 through pipe 74. Again electrical power is generated. While the contents of tank 24 are discharging into tank 20, control valves 50 and 76 are opened and tank 18 is pressurized through line 54 from the high-pressure gas reservoir 32, and control valve 78 is opened to vent the remaining cover gas in tank 22 through line 58 to the low-pressure gas reservoir 28. When tank 18 is fully pressurized and tank 22 is fully vented, control valves 50, 76 and 78 are closed.

Control valves 34 and 36 are then opened as the contents of tank 24 completely discharge into tank 20. Simultaneously, control valves 70 and 72 are closed, and valves 38 and 40 are opened and the electrically conductive fluid 16 in tank 18 discharges through the MHD generator section 12 into tank 22 and the system cycle repeats. While the contents of tank 18 are discharging into tank 22, control valves 50 and 86 are opened and tank 20 is pressurized through line 54 from the high-pressure gas reservoir 32, and control valve 88 is opened to vent the remaining cover gas in tank 24 through line 58 to the low-pressure gas reservoir 28. When tank 20 is fully pressurized with cover gas 26 and tank 24 is fully vented, control valves 50, 86 and 88 are closed.

The sequence of operation of the pulse power MHD system 10 then continues to repeat. System operation can continue dependent primarily upon the storage capacity of the high-pressure gas reservoir 32 and the capacity of the compressor 30. It is contemplated that auxiliary high-pressure gas from an external source (not shown) can be connected into the system 10 as desired. A blocking valve 90 in line 92 completes the system as illustrated.

The sequence of operation of the pulse power MHD system 10 as described can be briefly outlined by the following sequence of steps:

| Step | Electrically conductive fluid 16 discharged From | To | Tank vented to low pressure gas reservoir 28 | Pressurized from high pressure gas reservoir 28 | Time, seconds |
|---|---|---|---|---|---|
| 1 | 18 | 22 | | | 20 |
| 2 | 20 | 24 | 18 | 22 | 20 |
| 3 | 22 | 18 | 20 | 24 | 20 |
| 4 | 24 | 20 | 22 | 18 | 20 |
| 5 | 18 | 22 | 24 | 20 | 20 |
| 2 | 20 | 24 | 18 | 22 | 20 |
| 3, etc. | 22 | 18 | 20 | 24 | 20 |

As an illustrative example, one form of pulse power MHD system 10 having NaK as the electrically conductive working fluid and $N_2$ as the cover gas has the following:

Tank Pressure, 1,500 pounds per square inch absolute (p.s.i.a.).

Efficiency ($\eta$), 70 percent (%).

Output (P), $10^5$ kilowatt (kw.) = $2.65 \times 10^{11}$ $\frac{\text{foot/pound}}{\text{hour}}$ $\left(\frac{\text{ft./lb.}}{\text{hr.}}\right)$ Flow Rate, $W = \frac{P}{\frac{\Delta p}{\rho} \eta} = 2.63 \times 10^4$ pound/second (lb./sec.).

20 Second Flow, $5.26 \times 10^5$ lb./NaK.

Volume Requirement, $10^4$ cubic feet (cu.-ft.).

TANK SIZE (SPHERICAL)

| Radius: | Volume | No. of Tanks |
|---|---|---|
| 4 | 268 | 40 |
| 5 | 522 | 20 |
| 6 | 700 | 11 |
| 7 | 1,440 | 7 |
| 8 | 2,140 | 5 |

NaK Velocity Entering and Leaving Generator:

$\frac{\Delta P}{\rho} = \frac{V_1^2 - V_2^2}{2g}$; $V_1 = 490$ ft./sec.; $V_2 = 100$ ft./sec.

Generator Channel Inlet Area:

$2.63 \times 10^4$ lb /sec $\times 1/54$ cu.-ft./lb. = 490 cu.-ft./sec.

$A = \frac{490 \text{ cu.-ft./sec}}{490 \text{ ft./sec.}} = 1$ square foot (ft.$^2$).

Area of Inlet Pipes:

Fluid velocity 30 ft./sec.

$A = \frac{490 \text{ cu.-ft./sec.}}{30 \text{ ft./sec.}} = 16$ ft.$^2$.

2 Foot Diameter Pipe, Flow Area, $A_1 = 3.14$ ft.$^2$.

Number of Pipes, 5.

Low Pressure Gas Storage:

Gas Pressure, 15–17 p.s.i.a.

Gas Volume to be stored.

$10^4$ cu.-ft. $\frac{180 \text{ sec.}}{20 \text{ sec.}} \cdot \frac{1,500 \text{ pound/square inch (lb./in.}^2)}{15 \text{ pound/square inch (lb./in.}^2)} \cong 10^7$ cu.-ft.

Storage Tanks:

200 ft. diameter, 100 ft. height.

Volume: $\frac{2^2 \times 10^4 \times 10^2 \cdot t.}{4} = 3.14 \times 10^6$ cu.-ft, Number of storage tanks, 3.

High Pressure Storage Tanks:

Storage Pressure, 1,500–2,500 p.s.i.a.

Required Volume, $9 \times 10^4$ cu.-ft. $\frac{1,500 \text{ p.i.s a.}}{2,000 \text{ p.s.i.a.}} = 7.5 \times 10^4$ cu.-ft.

Compressor Station:

Efficiency, 50%.

Power Required, $2 \times 10^5$ kw $\frac{3}{60 \times 24} = 415$ kw.

MHD Generator (ambient temperatures) for a three-phase current supply:

Generator Output, 50,000 kw.

Flux Density, 12,000 gauss.

Frequency, 60–400 cycles per second (c.p.s.).

Power Density, 1 kilowatt/cubic centimeter (kw./cc.).

Voltage, 10 000 volts.

Current, 6–10,000 amperes.

Although a four-step cycle, i.e. charging a tank with electrically conductive fluid, pressurizing the tank, discharging the tank through a MHD generator section, and venting the tank of cover gas, has been illustrated and described, it is contemplated that a three-step cycle could be used. Thus, it is sidewise that the charging-and-venting steps could be completed in one step whereby both are done simultaneously.

As will be evidenced from the foregoing description, certain aspects of the invention are not limited to the particular details of construction as illustrated, and it is contemplated that other modifications and applications will occur to those

I claim:

1. The method for generating pulse electrical power by a magnetohydrodynamic generator system comprising the steps of:
   a. initially charging at least first and second container means with an electrically conductive fluid where the system has at least first, second, third and fourth container means suitably connected;
   b. initially pressurizing at least said first and second container means with a pressurized cover gas acting upon said electrically conductive fluid contained therein;
   c. sequentially discharging the pressurized electrically conductive fluid through a magnetohydrodynamic generator section electrically connected to an external load into sequential ones of said system container means beginning with said third container means in a repeating consecutive numerical order where the total number of system container means defines the numerical order, said sequential discharge beginning with said first container means so that said sequential discharge proceeds in a repeating consecutive numerical order;
   d. sequentially pressurizing consecutive ones of said container means as said discharging step is substantially completed, said sequential pressurization beginning with said third container means so that said sequential pressurization proceeds in a repeating consecutive numerical order; and
   e. sequentially venting consecutive ones of said container means simultaneously with said sequential discharging and said sequential pressurization, said sequential venting beginning with said first container means so that said sequential venting proceeds in a repeating consecutive numerical order.

2. The method for generating pulse electrical power by a magnetohydrodynamic generator system comprising the steps of:
   a. initially charging at least first and second container means with an electrically conductive fluid where the system has at least first, second, third and fourth container means suitably connected;
   b. initially pressurizing at least said first and second container means with a pressurized cover gas acting upon said electrically conductive fluid contained therein;
   c. sequentially discharging the pressurized electrically conductive fluid through a magnetohydrodynamic generator section electrically connected to an external load, said sequential discharge beginning with said first container means so that said sequential discharge proceeds in a repeating consecutive numerical order where the total number of system container means defines the numerical order;
   d. sequentially receiving said electrically conductive fluid from said generator section, said sequential receiving beginning with said third container means so that said sequential receiving proceeds in a repeating consecutive numerical order;
   e. sequentially pressurizing consecutive ones of said container means as said receiving step is substantially completed, said sequential pressurization beginning with said third container means so that said sequential pressurization proceeds in a repeating consecutive numerical order; and
   f. sequentially venting consecutive ones of said container means simultaneously with said sequential discharging and said sequential pressurization, said sequential venting beginning with said first container means so that said sequential venting proceeds in a repeating consecutive numerical order.

3. The method for generating pulse electrical power by a magnetohydrodynamic generator system comprising the steps of:
   a. initially charging at least first and second container means with an electrically conductive fluid where the system has at least first, second, third and fourth container means suitably connected;
   b. initially pressurizing at least said first and second container means from a high-pressure cover gas reservoir with a pressurized cover gas acting upon said electrically conductive fluid contained therein;
   c. sequentially discharging the pressurized electrically conductive fluid through a magnetohydrodynamic generator section electrically connected to an external load, said sequential discharge beginning with said first container means so that said sequential discharge proceeds in a repeating consecutive numerical order where the total number of system container means defines the numerical order;
   d. sequentially receiving said electrically conductive fluid from said generator section, said sequential receiving beginning with said third container means so that said sequential receiving proceeds in a repeating consecutive numerical order;
   e. sequentially pressurizing consecutive ones of said container means from a high-pressure cover gas reservoir as said receiving step is substantially completed, said sequential pressurization beginning with said third container means so that said sequential pressurization proceeds in a repeating consecutive numerical order;
   f. sequentially venting consecutive ones of said container means to a low-pressure cover gas reservoir simultaneously with said sequential discharging and said sequential pressurization, said sequential venting beginning with said first container means so that said sequential venting proceeds in a repeating consecutive numerical order; and
   g. compressing said low-pressure cover gas from said low-pressure cover gas reservoir for said high-pressure cover gas reservoir.